US005751372A

United States Patent [19]

Forson

[11] Patent Number: 5,751,372
[45] Date of Patent: May 12, 1998

[54] METHOD AND APPARATUS FOR NAVIGATING AN ON-SCREEN PROGRAM GUIDE

[75] Inventor: Henry Forson, Annandale, Va.

[73] Assignee: Hughes Electronics, Los Angeles, Calif.

[21] Appl. No.: 604,120

[22] Filed: Feb. 19, 1996

[51] Int. Cl.⁶ .................................................. H04N 5/50
[52] U.S. Cl. .................................... 348/569; 348/906
[58] Field of Search ............................... 348/569, 906, 348/589, 600; H04N 5/50, 9/74, 9/76

[56] References Cited

U.S. PATENT DOCUMENTS

| | | | |
|---|---|---|---|
| 5,353,121 | 10/1994 | Young | 348/563 |
| 5,523,796 | 6/1996 | Marshall | 348/600 |
| 5,532,754 | 7/1996 | Young | 348/569 |
| 5,559,548 | 9/1996 | Davis | 348/906 |
| 5,585,838 | 12/1996 | Lawler | 348/906 |
| 5,596,373 | 1/1997 | White | 348/569 |

FOREIGN PATENT DOCUMENTS

| | | |
|---|---|---|
| 0 682 452 A2 | 11/1995 | European Pat. Off. . |
| WO 94/13107 | 6/1994 | WIPO . |
| WO 95 01057 A | 1/1995 | WIPO . |
| WO 95/07003 | 3/1995 | WIPO . |

Primary Examiner—Sherrie Hsia
Attorney, Agent, or Firm—Wanda Denson-Low; John Whelan

[57] ABSTRACT

A method and apparatus for generating and navigating an on-screen program guide comprising current and future scheduling information for a plurality of different program sources. The method comprises the steps of entering a date and a time which defines a reference time for the on-screen program guide, and generating the on-screen program guide containing scheduling information for the plurality of different program sources including the user-entered reference time.

16 Claims, 3 Drawing Sheets

PROGRAM GUIDE　　　　　　　　　　　　　　WED, NOV 23 · 12:33PM
COMPLETE  NORMAL ( MAIN MENU )  ( CATEGORIES )  ( TYPES )  ( LISTS )  ( GUIDES )  ( CLASSES )

| TODAY | 12:30 PM | 1:00 PM | 1:30 PM |
|---|---|---|---|
| DTV 200 | DIRECTV | | DIRECTV |
| CNN 202 | CAPITAL GANG | SPORTS | NEWS |
| CRT 203 | VERDICTS & JUSTICE | ✓ INSTANT JUSTICE | |
| TNT 212 | SINBAD AND THE EYE OF THE TIGER | | |
| TBS 233 | BULLITT | | |
| CSPN 242 | C-SPAN | C-SPAN | C-SPAN |
| A&E 256 | 55 DAYS AT PEKING | | |

FIG. 2

|  | TUE | WED | THU | FRI |
|---|---|---|---|---|
| MORNING | ▪ | ☐ | ☐ | ☐ |
| AFTERNOON | ☐ | ☐ | ☐ | ☐ |
| EVENING | ☐ | ☐ | ☐ | ☐ |
| LATE NIGHT | ☐ | ☐ | ☐ | ☐ |

FIG. 3

METHOD AND APPARATUS FOR NAVIGATING AN ON-SCREEN PROGRAM GUIDE

BACKGROUND OF THE INVENTION

1. Field of the Invention

The present invention relates generally to a subscription television system, and more particularly, to a method and apparatus for navigating an on-screen program guide.

2. Description of the Prior Art

As the subscription television industry has grown, providers of subscription television continually offer more and more channels to the individual subscriber. Typical systems offer more than 100 different channels. Such systems also typically display a channel or program guide, which identifies all available channels, the programs currently airing on each channel and upcoming programs.

FIG. 1 of U.S. Pat. No. 5,353,121 (the '121 patent), which is herein incorporated by reference, illustrates a typical program guide. As shown, the program guide includes a plurality of channel identifiers and a listing of the shows and programs upcoming on each channel. The titles of the various programs are listed in an array of irregular cells. The size of each cell varies from a fraction of an hour to several hours in accordance with the length of the associated program.

Such known systems provide limited means for navigating or traversing (i.e., searching for future events) the program guide. For example, the system of the '121 patent simply allows the viewer to scroll to the right on a cell by cell basis to view future events. Each time the cursor is commanded to move one cell to the right, the program guide is advanced an additional half-hour forward in time.

Other known systems allow the user to advance the program guide forward in time in accordance with times corresponding to the start times of auxiliary program guides, which contain future event information. Known auxiliary program guides have names such as +5.0HRS, +16HRS, +27HRS, +38HRS, etc. Upon selecting one of the auxiliary program guides, the program guide is advanced in time by the duration indicated by the name of the selected auxiliary program guide.

The foregoing methods of navigating a program guide forward in time suffer from various drawbacks. First, as the navigation means of the '121 patent only allows the viewer to advance the program guide in half-hour increments, advancing the guide days or weeks into the future requires a considerable amount of time and effort on behalf of the viewer, which must be duplicated in reverse if the viewer desires to return the guide to the current time. Second, advancing the guide on the basis of predefined hour increments assigned to the auxiliary program guides, requires the viewer to perform numerous, and often somewhat difficult, calculations to determine exactly how far in advance the viewer desires to move the guide. For example, assuming on a Wednesday afternoon the viewer wants to see the program guide for the following Tuesday evening, it is not readily determinable how far in advance one should move the program guide.

Thus, there exists a need for a method and apparatus for advancing the program guide forward in time which allows the viewer to readily and easily advance the guide to the desired date and time in the future.

SUMMARY OF THE INVENTION

The present invention provides a method and apparatus for navigating an on-screen program guide which solves the aforementioned problems. Specifically, the present invention provides a method and apparatus for navigating an on-screen program guide utilizing user-oriented time designations.

The present invention generally relates to a method of navigating an on-screen program guide comprising current and future scheduling information for a plurality of different program sources. The method comprises the steps of entering a date and a time which defines a reference time for the on-screen program guide, and generating the on-screen program guide containing scheduling information for the plurality of different program sources including the user-entered reference time.

The present invention also generally relates to an apparatus for generating an on-screen program guide comprising current and future scheduling information for a plurality of different program sources. The apparatus comprises means for receiving a signal which includes the current and future scheduling information for a plurality of different program sources, memory means coupled to the receiving means for storing the scheduling information, user input means for entering a date and a time which define a reference time for the on-screen program guide and a system controller coupled to the memory means and the user input means. The system controller functions to generate the on-screen program guide including a user-entered reference time.

As described in detail below, the method and apparatus of the present invention provide important advantages over the prior art. Most importantly, the present invention allows the viewer to readily and easily advance the guide to any desired future time, and thereby eliminates the need for the viewer to repeatedly advance the guide by half-hour increments to view future scheduling information. The present invention also eliminates the need for the viewer to perform calculations to determine how far into the future the guide should be advanced.

The invention itself, together with further objects and attendant advantages, will best be understood by reference to the following detailed description, taken in conjunction with the accompanying drawings.

BRIEF DESCRIPTION OF THE DRAWINGS

FIG. 2 illustrates an exemplary on-screen program guide produced by the apparatus of FIG. 1.

FIG. 3 illustrates an exemplary selection display produced in accordance with the present invention.

DETAILED DESCRIPTION OF THE DRAWINGS

Figure 1:
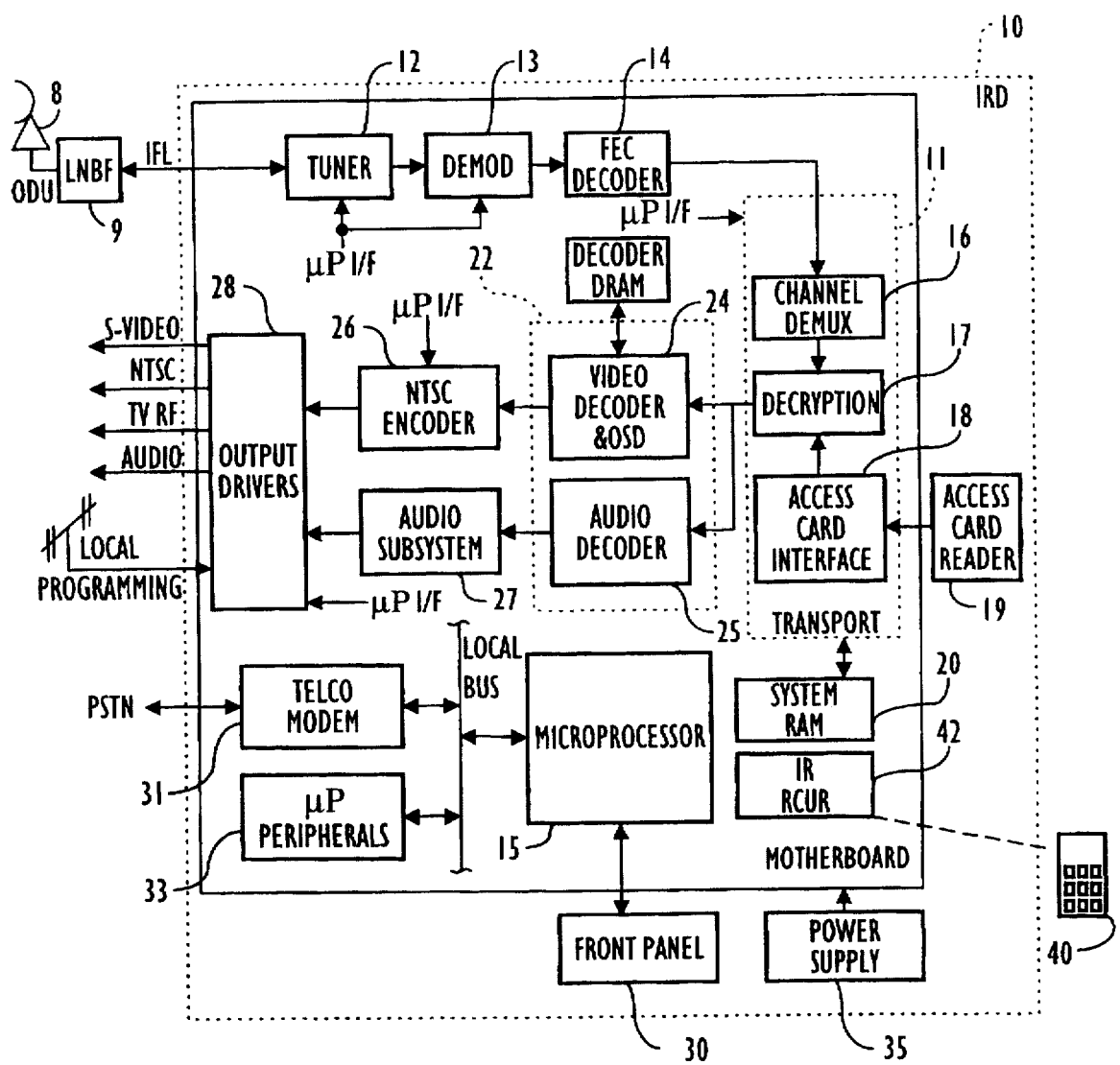
FIG. 1 is a functional block diagram of an apparatus capable of generating and navigating on-screen program guides in accordance with the present invention.

FIG. 1 is a functional block diagram of an apparatus 10 capable of generating and navigating on-screen program guides in accordance with the present invention. As shown in FIG. 1, the apparatus 10 includes receiving means comprising tuner 12, demodulator 13 and FEC decoder 14. The receiving means is controlled by a microprocessor 15, and operates to receive a signal which includes program guide information, and video and audio information for all channels available on the given system.

In the embodiment of FIG. 1, an antenna 8 and low noise filter 9 function to receive the signal from a satellite source and to couple the signal to the tuner 12 of the receiving means of the apparatus 10. However, it is noted that the present invention is not limited to system providers which utilize satellite transmissions to broadcast signals. The novel system of the present invention could be readily used with system providers who supply signals via, for example, cable or telephone lines.

Upon receipt of the signal, tuner 12 functions to downconvert the received signal to an intermediate frequency ("IF") signal. The IF signal is then converted to a digital equivalent by the demodulator 13 and coupled to FEC decoder 14, which provides forward error correction on the received signal.

Apparatus 10 also comprises a transport chip 11. The transport chip 11 preferably comprises a channel demultiplexer 16, a decryption unit 17 and an access card interface 18. The output of the decoder 14 is coupled to the channel demultiplexer 16, which functions to separate the audio and video information of each channel, and also separates the program guide information. Under control of the microprocessor 15, the channel demultiplexer 16 provides at its output port, the audio and video information of a selected channel or the program guide information.

Transport chip 11 further comprises an access card reader 19 which is coupled to the access card interface 18. The access card interface 18 operates in conjunction with the decryption unit 17 and the access card reader 19 to provide a means of preventing, for example, unauthorized pay-per-view movies from being ordered by children.

Apparatus 10 further comprises a modem 31 which allows the microprocessor 15 to be coupled to the public telephone network, microprocessor peripherals 33, such as serial and/or parallel data ports, and a power supply 35 for supplying power.

In the satellite system illustrated in FIG. 1, multiple transponders located in a satellite (not shown) are utilized to transmit channel information (e.g., audio, video) to the apparatus 10. Each transponder transmits information regarding multiple channels (i.e., multiple program sources, such as ABC, CBS, etc.). However, each transponder also transmits the program guide information for every channel provided by the system provider on one of the data streams available within the given transponder.

As such, regardless of which transponder the tuner 12 is tuned to, the program guide information is available at the output of the channel demultiplexer 16. Under control of the microprocessor 15, the program guide information is stored in random access memory ("RAM") 20, which is coupled to the transport chip 11. The system RAM 20 also functions to buffer the digital data associated with the audio and video data of a given channel.

The microprocessor 15 operates to periodically update the program guide information stored in the system RAM 20. In the present embodiment, the program guide information is preferably updated one of two ways. First, the microprocessor 15 periodically analyzes the program guide information transmitted by the system provider to determine if the information has been updated. This can be accomplished, for example, by utilizing a flag byte which indicates that the program guide has been modified. If the program guide has been modified, the microprocessor 15 stores the updated guide in the system RAM 20. Second, as an independent process, the microprocessor 15 monitors an expiration date/time transmitted along with the program guide information. Upon reaching the expiration date/time, the microprocessor 15 updates the program guide stored in system RAM 20 with the program guide currently being transmitted.

Returning to FIG. 1, the apparatus 10 of the present invention further comprises a MPEG chip 22, for example, Part No. 64002, manufactured by LSI Logic. The MPEG chip 22 comprises a video decoder and an on-screen display generator 24, and an audio decoder 25. The MPEG chip 22 functions to decompress the audio and video data output by the channel demultiplexer 16, which is transmitted by the provider in a compressed format. The NTSC encoder 26 and audio subsystem 27 format the decompressed audio and video data, respectively, for display on, for example, a television receiver. The output drivers 28 function to transmit the audio and video information of a selected channel to the display screen of the television receiver.

In the event the subscriber/viewer selects to display the program guide, which can be accomplished by selecting the predefined button associated with the program guide, via front panel 30 or a remote control 40, the microprocessor 15 retrieves the program guide information from system RAM 20, and then accesses a font table stored in memory. The microprocessor 15 then converts the program guide information stored in memory 20 into displayable graphics data. The displayable graphics data is then coupled to the MPEG chip 22. As described above, the MPEG chip 22 in combination with NTSC encoder 26 and the output drivers 28, functions to write the program guide information to the television receiver.

FIG. 2 illustrates an exemplary on-screen program guide produced by apparatus 10. As shown in FIG. 2, each screen of the program guide comprises approximately seven program sources and the corresponding programs. The program source and the programs being shown thereon are displayed on a single line comprising multiple cells of varying length. The first cell in each line indicates the program source and the channel number assigned to the source. In order to view additional program information, the viewer simply presses a designated key, for example, a page down key (i.e., scroll down key) and the foregoing process is repeated for the new program data to be displayed. Typically, the default reference time (also referred to as a start time) for the program guide is the nearest half-hour preceding the current time. Thus, for example, if the current time was 9:05 AM, the program guide will display information regarding programs being broadcast starting at 9:00 AM, when the program guide is initially recalled by the viewer.

In accordance with the present invention, the apparatus 10 also allows the viewer to specify a desired start time for the program guide. More specifically, upon command by the viewer, the microprocessor 15 functions to generate a display requesting the viewer to specify the desired start time for the on-screen guide. Upon entry of the desired start time by the viewer, the microprocessor 15 recalls the corresponding program guide information from memory 20 and generates an on-screen program guide, as explained above, containing the program information corresponding to the desired start time. In the preferred embodiment, the start time of the guide is typically the time entered by the viewer or the nearest half-hour preceding the time entered by the viewer.

In order to retrieve the appropriate portion of the program guide stored in memory, the microprocessor 15 compares the start time entered by the viewer to a time designation field stored as part of the program guide information. The time designation field contains data identifying the time location of the corresponding portion of the program guide (i.e., the date and time, or a time difference relative to the current date and time). The data contained within the time designation fields are transmitted along with the program guide information supplied by the system provider. Once the microprocessor 15 locates the time designation field having a date and time nearest the time entered by the viewer, the microprocessor 15 functions to display the program guide information containing that time. Typically, the displayed guide will begin with the half-hour interval containing the user-entered reference time. However, at certain boundary conditions, such as when insufficient guide information following the reference time is stored in memory, the displayed guide may start at an earlier time.

The time designation fields operate to define subsets of the entire program guide stored in memory 20 so as to allow the microprocessor 15 to retrieve the appropriate portion of the program guide. More specifically, each time designation field corresponds to a specific portion of the entire guide. For example, assuming that the duration between time designation fields is one half-hour, each time designation field corresponds to approximately one half-hour of programming. Thus, the times contained in the time designation fields would increment in 30 minute intervals (e.g., 9:30 AM, 10:00 AM, 10:30 AM, etc.) Upon receipt of a search command, as explained below, the microprocessor 15 simply compares the contents of the time designation fields to the desired start time until the closest match is identified. Once identified, the microprocessor 15 functions to display the program guide forward from that point in time. Of course, the duration between time designation fields can be varied. Further, it is also possible to generate guide graphics based on actual program start and end times.

The present invention provides various methods for entering the desired start time of the program guide. One such method is via an infra-red "IR" remote 40 control device. (The IR remote 40 includes a switch array which provides means for viewers to issue instructions to the microprocessor 15. The IR remote 40 communicates with the microprocessor 15 via IR receiver 42.) To enter the date and time, the viewer accesses a program guide display menu generated by the microprocessor 15 which requests entry of the desired start time. Upon entry of the desired date and time (i.e. start time), the viewer depresses an SELECT key provided on the IR remote 40.

Depression of the SELECT key, while viewing the program guide display menu, commands the microprocessor 15 to locate the portion of the guide nearest the date and time entered by the viewer. More specifically, upon depression of the SELECT key, a search command is forwarded to the microprocessor 15 via the IR receiver 42. Upon receipt of the search command, the microprocessor 15 records the date and time entered by the viewer and compares the date and time with the times contained in the time designation fields associated with the program guide stored in memory 20. As stated above, upon locating the closest match, the microprocessor 15 retrieves and functions to cause the display of the corresponding program guide.

An alternative method of entering the desired start time is illustrated in FIG. 3. Specifically, FIG. 3 illustrates a menu, hereinafter referred to as a selection display, which allows the viewer to select a desired start time for the program guide from a list of predetermined days and times. The menu is accessible via either the remote control 40 or the front panel display 30. Upon selection of a desired day and time, the microprocessor 15 converts the selected day and time range to a numerical date and time, and then proceeds in the same manner as described above to locate and generate the corresponding program guide.

In the example shown in FIG. 3, the selection display presents four consecutive days and four time ranges within each day for selection by the viewer. The time ranges shown, morning afternoon evening or late night can correspond to, for example, 6:00 AM, 12:00 PM, 6:00 PM and 11:00 PM, respectively. However, other time designations are possible. Indeed, the time designations can be predetermined by the system provider or programmable by the viewer.

Similarly, the number of days contained in the selection display can be predetermined by the system provider or programmable by the viewer. As shown, in the preferred embodiment, the days set forth in the display run consecutively from the current day. Further, the number of days contained in the selection display preferably do not exceed one week so that any confusion regarding whether a given day corresponds to the current week or the following week is avoided. Again, however, other variations are possible.

In another embodiment of the present invention, the remote control 40 is provided with an ACTION key, which functions to advance the guide a predetermine time into the future. For example, the ACTION key can be utilized to forward the program guide one day into the future (i.e., 24 hours from time of the program guide currently being shown). This can be accomplished by programming the microprocessor 15 to advance the program guide the predetermined amount of time, each time the ACTION key is depressed while viewing the program guide. Further, the ACTION key can utilized with other keys, such as scroll keys, so as to move the guide forward or backward in time by a predetermined amount.

The method and apparatus of the present invention provides important advantages over the prior art. Most importantly, the present invention allows the viewer to readily and easily advance the guide to a desired future time, and thereby eliminates the need for the viewer to repeatedly advance the guide by half-hour increments to view future scheduling information. Furthermore, the present invention eliminates the need for the viewer to perform calculations to determine how far into the future the guide should be advanced.

Of course, it should be understood that a wide range of changes and modifications can be made to the preferred embodiment described above. It is therefore intended that the foregoing detailed description be regarded as illustrative rather than limiting and that it be understood that it is the following claims, including all equivalents, which are intended to define the scope of the invention.

What is claimed is:

1. A method of navigating an on-screen program guide comprising current and future scheduling information for a plurality of different program sources, said method comprising the steps of:

entering a date and a time, said date and a time defining a reference time for said on-screen program guide, and generating said on-screen program guide containing scheduling information for a subset of said plurality of different program sources including said reference time.

2. The method of navigating an on-screen program guide according to claim 1, wherein said on-screen program guide displays scheduling information for programs currently broadcasting at said reference time and for programs being broadcast before said reference time.

3. The method of navigating an on-screen program guide according to claim 1, wherein said on-screen program guide displays scheduling information for programs currently broadcasting at said reference time and for programs being broadcast after said reference time.

4. The method of navigating an on-screen program guide according to claim 1, wherein said step of entering a date and a time defining a reference time for said program guide comprises:

generating a selection display including a plurality of times within a given day, selecting a single time from said plurality of times, wherein said selected time represent said reference time.

5. The method of navigating an on-screen program guide according to claim 1, wherein said step of entering a date and a time defining a reference time for said program guide comprises:

generating a selection display, said selection display including a plurality of days and a plurality of times within a given day, selecting a single day from said plurality of days and a single time from said plurality of times, wherein said selected day and said selected time represent said reference time.

6. The method of navigating an on-screen program guide according to claim 5, wherein said plurality of times within a given day are designated by name.

7. The method of navigating an on-screen program guide according to claim 5, wherein said plurality of times within a given day are designated by names including morning, afternoon, evening, and late night.

8. An apparatus for generating an on-screen program guide comprising current and future scheduling information for a plurality of different program sources, said apparatus comprising:

means for receiving a signal, said signal including said current and future scheduling information for a plurality of different program sources;

memory means coupled to said receiving means, said scheduling information being stored in said memory means;

user input means for entering a date and a time, said date and time defining a reference time for said on-screen program guide;

a system controller coupled to said memory means and said user input means, said system controller operative for generating said on-screen program guide containing scheduling information for a subset of said plurality of different program sources including said reference time.

9. The apparatus for generating an on-screen program guide according to claim 8, further comprising a display means coupled to said system controller, said display means operative for displaying said on-screen program guide generated by said system controller.

10. The apparatus for generating an on-screen program guide according to claim 8, wherein said on-screen program guide displays scheduling information for programs currently broadcasting at said reference time and for programs being broadcast before said reference time.

11. The apparatus for generating an on-screen program guide according to claim 8, wherein said on-screen program guide displays scheduling information for programs currently broadcasting at said reference time and for programs being broadcast after said reference time.

12. The apparatus for generating an on-screen program guide according to claim 8, wherein:

said system controller is operative for generating a selection display, said selection display including a plurality of times within a given day, and said user input means is operative for allowing a viewer to select a single time from said plurality of times;

said selected time representing said reference time of said on-screen program guide.

13. The apparatus for generating an on-screen program guide according to claim 8, wherein:

said system controller is operative for generating a selection display, said selection display including a plurality of days and a plurality of times within a given day, and said user input means is operative for allowing a viewer to select a single day from said plurality of days and a single time from said plurality of times;

said selected day and said selected time representing said reference time of said on-screen program guide.

14. The apparatus for generating an on-screen program guide according to claim 13, wherein said plurality of times within a given day are designated by name.

15. The apparatus for generating an on-screen program guide according to claim 13, wherein said plurality of times within a given day are designated by names including morning, afternoon, evening, and late night.

16. The apparatus for generating an on-screen program guide according to claim 13, wherein said plurality of days includes a week of consecutive days, said days being designated by name.

* * * * *